J. B. FOWLER.
RAILWAY AND CAR AND APPLIANCES THEREFOR.
APPLICATION FILED APR. 5, 1907.
961,293.
Patented June 14, 1910.
5 SHEETS—SHEET 1.
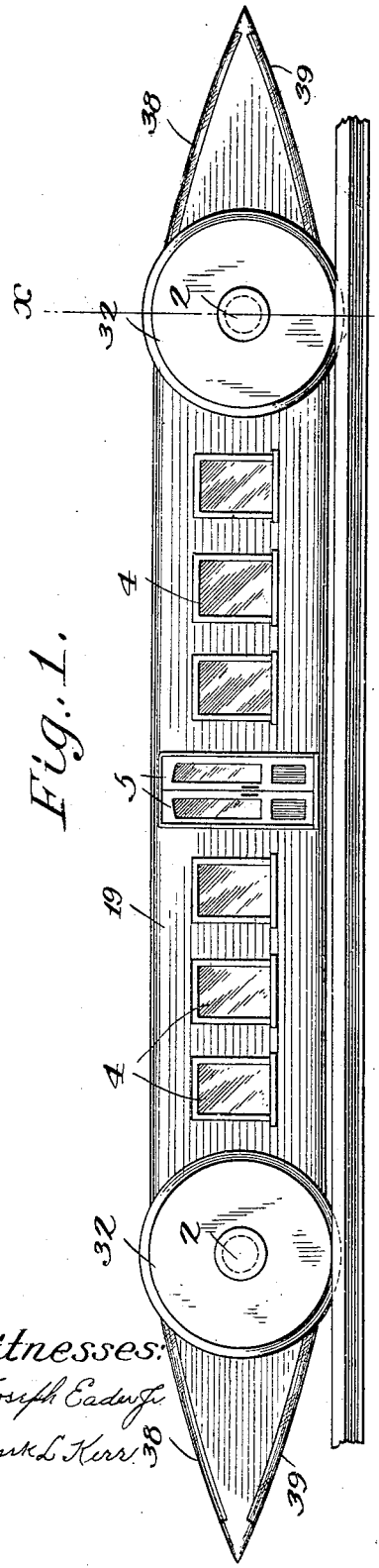
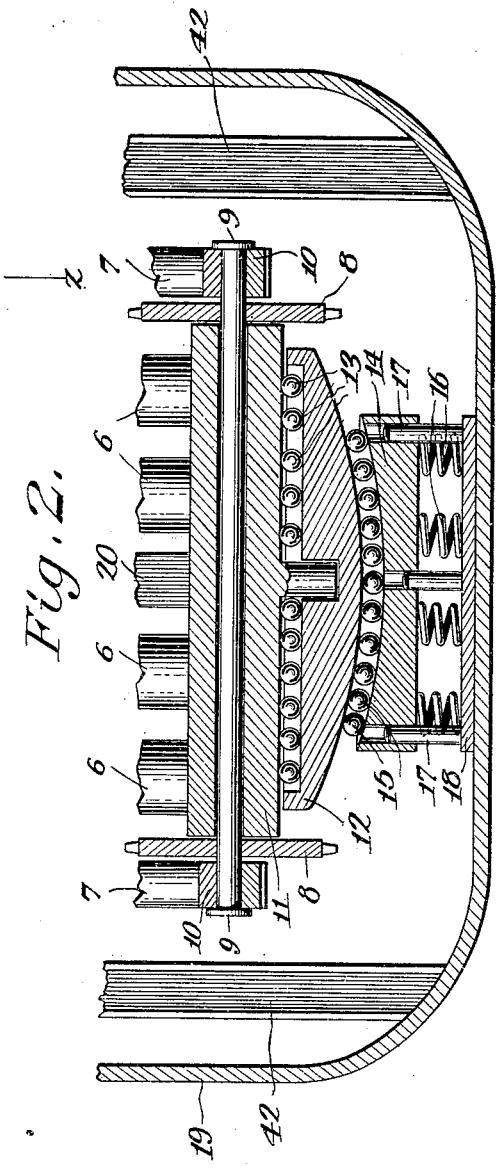
Witnesses:
Joseph Eader Jr.
Frank L. Kerr
Inventor:
James B Fowler

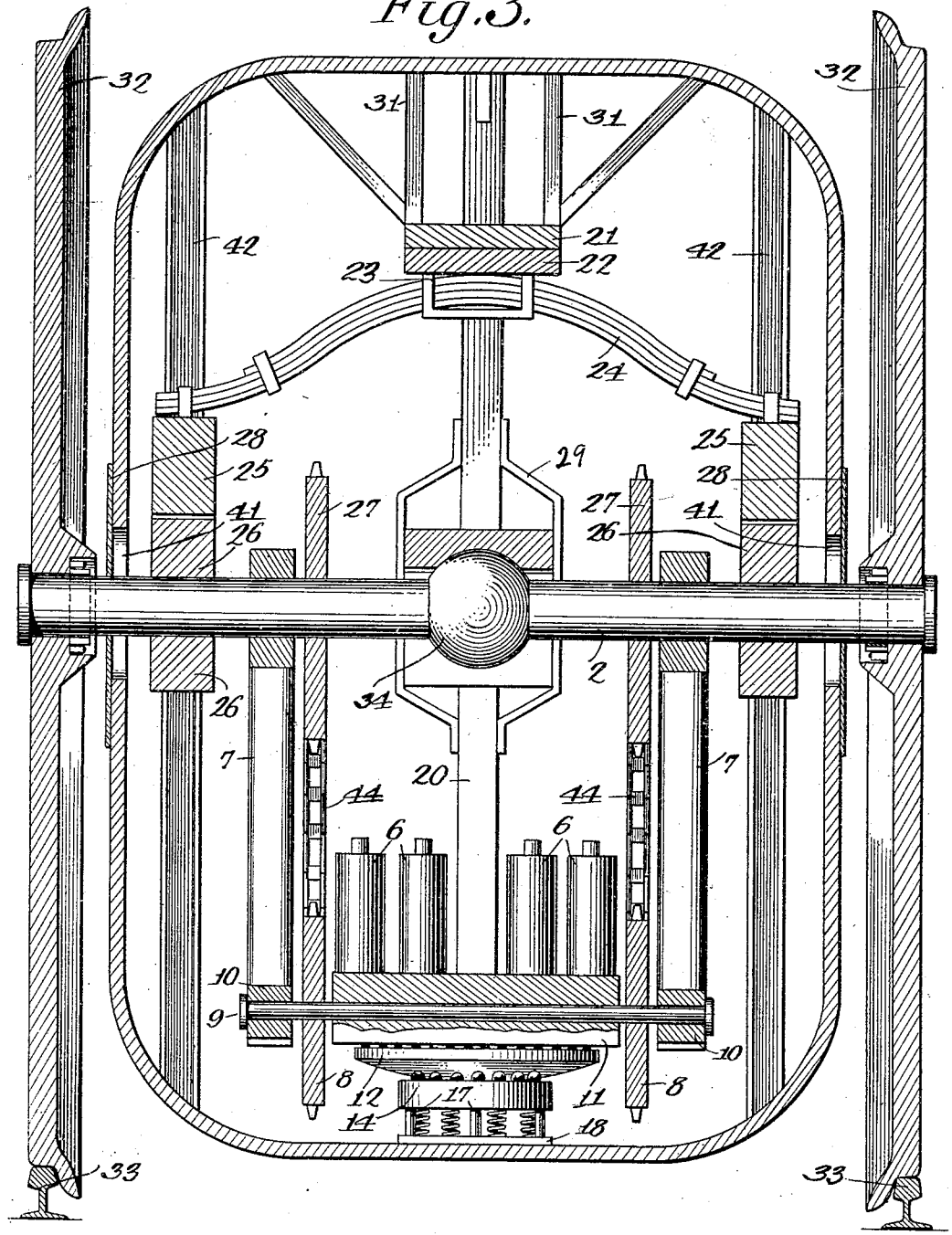

J. B. FOWLER.
RAILWAY AND CAR AND APPLIANCES THEREFOR.
APPLICATION FILED APR. 5, 1907.
961,293.
Patented June 14, 1910.
5 SHEETS—SHEET 3.
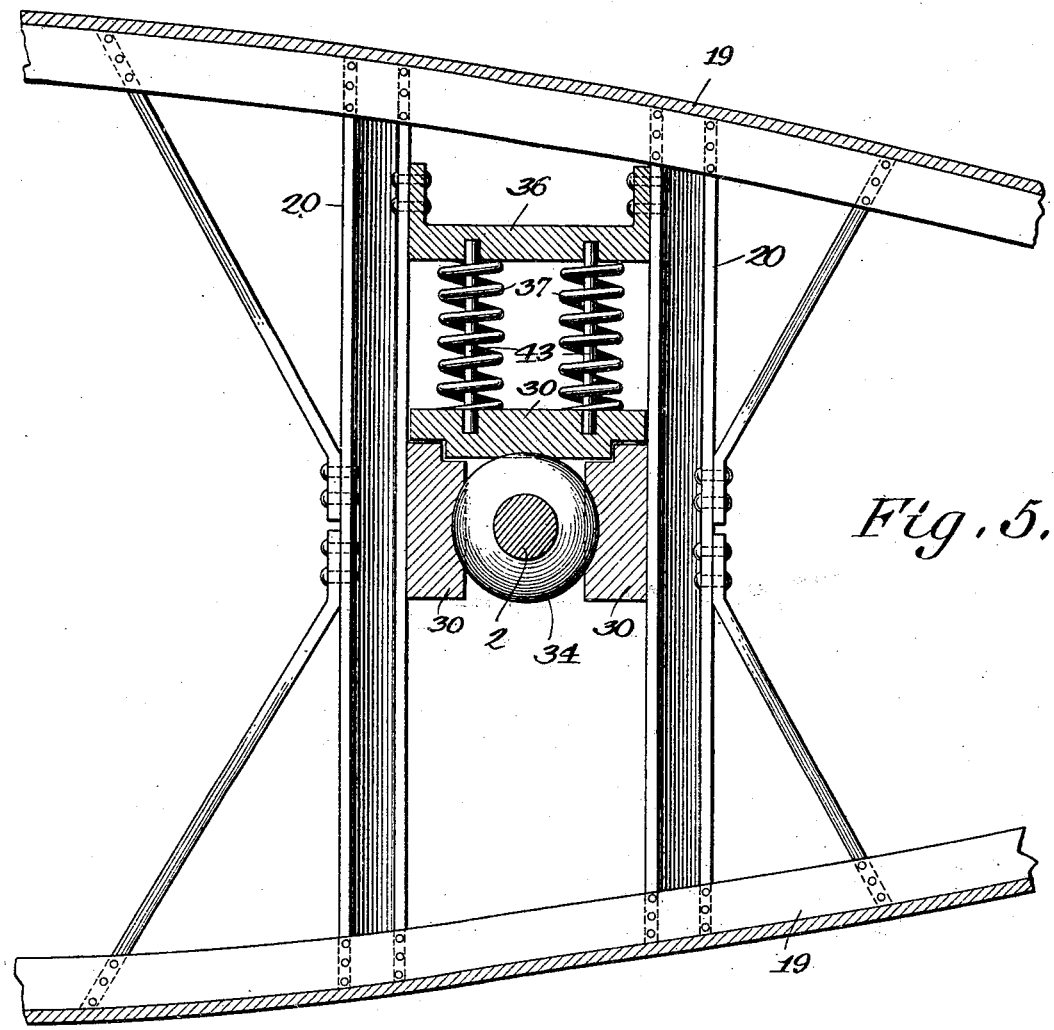

J. B. FOWLER.
RAILWAY AND CAR AND APPLIANCES THEREFOR.
APPLICATION FILED APR. 5, 1907.
961,293.
Patented June 14, 1910.
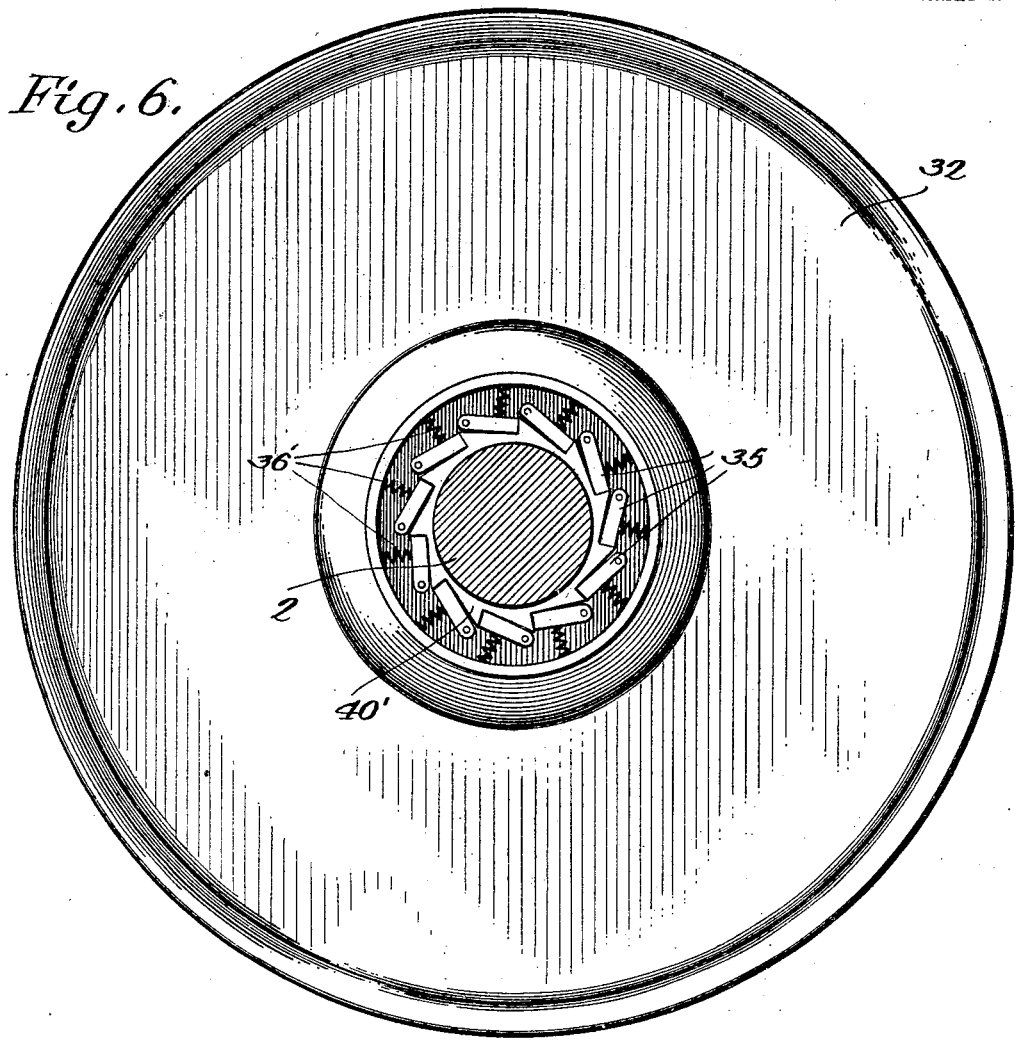
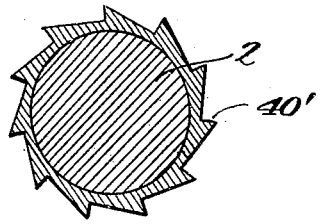
Witnesses:
Joseph Eader Jr.
Frank L. Kerr.
Inventor:
James B Fowler

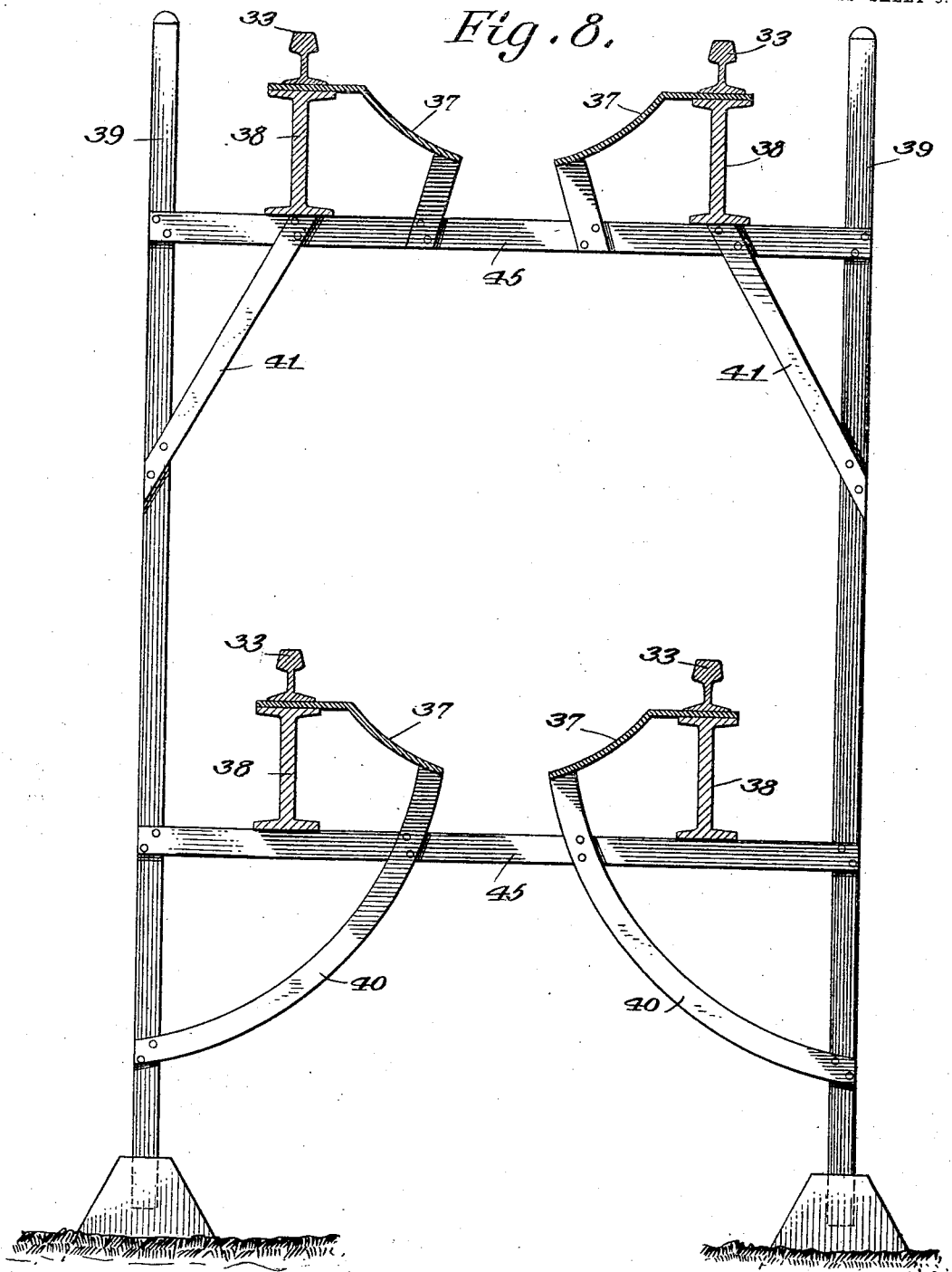

UNITED STATES PATENT OFFICE.

JAMES B. FOWLER, OF COLUMBUS, OHIO, ASSIGNOR TO FOWLER AUTOMOBILE RAILWAY EQUIPMENT COMPANY.

RAILWAY AND CAR AND APPLIANCES THEREFOR.

961,293.     Specification of Letters Patent.     Patented June 14, 1910.

Application filed April 5, 1907. Serial No. 366,610.

*To all whom it may concern:*

Be it known that I, JAMES B. FOWLER, a citizen of the United States, residing at Columbus, Ohio, have invented certain new and useful Improvements in Railways and Cars and Appliances Therefor, of which the following is a specification.

My invention relates to improvements in railroad systems and it is particularly applicable to rapid transit elevated railroads, although it is not intended to restrict it to the same.

This invention therefore embraces a novel construction and design of car cylindrical in shape and pointed at both ends which presents no opposing surfaces and reduces the atmospheric friction to a minimum while proceeding at high rates of speed.

While this car is designed primarily for a railroad, at the same time, it is possible to use the same as an "automobile" by a slight alteration of the wheels, so as to permit the attachment of rubber tires as used on ordinary automobiles, thus allowing this car to be used as occasion demands on roads or streets. While desiring to use this car to a great degree on railroads, it is not designed to limit it or permit the particular application described herein to be limited in its scope to railroads.

My invention likewise includes a novel construction of car-trucks wherein a single pair of wheels is used near each end of the coach or car so that four wheels are all that is necessary for the car, the axles in each case passing through the sides of the car near each end, the coach being supported near each end by the shaft or axle of the wheels. Motive power may be preferably electricity which can be supplied through a motor or motors at either end of the car, the energy supplied by direct or alternating current through the rails or by trolley, storage batteries, steam, gasolene or any other power, manner or process; can also be used for motive power; and another novel form of construction is in the fact that all the machinery for the application of power is inside the car and supplied direct to the axle, so that there is nothing outside the car but the wheels and ends of axle to offer resistance to the air and catch dust or dirt.

Another novel feature in this system is in construction of the wheels which are much larger than any now in use for similar purposes. One advantage in their being of a large diameter is that they turn less frequently in traveling a given distance than smaller wheels, thereby reducing the number of revolutions and minimizing friction and lessening the use of lubricants with a consequent economy of power and expense.

Another novel feature is in the construction of the wheels and axles which are made in such shape and adjusted in such a manner that short or reverse curves may be traveled in safety and yet are so constructed as to allow both wheels to turn with the same rapidity as the axle turns, while permitting one of the wheels to travel at a greater rate of speed as is necessary on the outside rail on curves, without producing any strain on the axle or wheel.

Another novel and important feature of my invention is in the fact that the axles pass through the car near each end at or above the center of car so that the weight of the car is near the plane of the axle. This does away with the top heavy characteristics of the present railroad car construction and thus increases safety, diminishes risk and in fact makes it almost impossible for the car to topple over or leave the track. The weight of the car being suspended upon the axle between the rails, if any accident should occur through defective axle or wheel, spreading of rails or wheels leaving track, the car would drop down on the protecting shields under the track and slide along in the trough thus provided until the momentum ceased. Therefore it is possible to attain tremendous rates of speed with absolute safety.

Another object is to provide driving wheels of great height without piston-rods doing away with dead-centers and counterweights thus permitting these large wheels to be driven at a very high rate of speed.

Another object is providing means for the application of power inside the car, by which power the car can be driven at a very high rate of speed.

A further object is to provide a car-wheel which will not be cracked or broken by centrifugal force, or other causes, while running at a high rate of speed, and another feature of my system is the novel construction of car-wheel with hub turning loosely on the axle, and driven by means of pawls engaging ratchet-teeth on the axle, also to reduce the cost of operation and maintenance and at the same time increase the speed and degree of safety.

Another object and novel feature of the car is, it is so constructed that a portion of the pointed ends can be removed at any time, exposing the draw-bars so that one car can be coupled to another when desired.

Another object and novel feature is the sphere or ball shaped center of the driving shaft. This is made in this shaft to give a center bearing that will allow the shaft to move in any direction (except crosswise of the car) to equalize the movement of the car while the shaft is being driven forward or backward.

Another object is to do away with the heavy trucks, rods and chains underneath the car, brakes, brake-shoes, brake-beams, spring-planks, side-bearings and other useless contrivances now used beneath cars in the present system of railroad car construction.

Still another object and important feature of this invention is the mechanism employed to make the transmission of motive power to the driving shafts by sprocket wheels and chains effective, while the shaft is allowed to rotate and move in any direction except crosswise of the car. While I prefer to use this method of transmission of the motive power, I do not mean to limit myself to that.

Another novel and important object of this system is the table upon which the motive power is placed. As this table is supported and held in place by hangers which have bearings on the driving shaft to relieve the friction from the driving shaft by placing springs beneath the table to support the weights of table and contents, and assist in equalizing the motions of the car while in action, and further to keep the motive power at all times and under all conditions in perfect line with the shaft.

Another novel and important object is the manner in which the car's weight is supported by the axles (which run through the body of the car near either end) from the inside of the roof, and which I claim is new and original with me. The mechanism here employed places the weight near either end of the axle. Springs are also provided to equalize the motions of the car and take away the effects of any sudden jar or jolt. Chafing plates are also provided to allow the car body to move in an opposite direction from the shaft or axle as would often occur in turning curves.

Another very important factor in this invention is, that by the particular mechanism herein employed, the car body is permitted to adjust its equilibrium to conform to the speed of the car in rounding curves, and further that a speed of one hundred miles per hour can be made around curves with perfect safety. And further that the outside rail on a curve does not have to be raised in proportion to the speed expected to be made around such a curve. That any curve with the outside rail raised to permit of a car of this design and equipment to travel around at a rate of 150 miles per hour, can be used by cars of any speed less than 150 miles with the same degree of safety.

Another object and feature of my invention embraces a novel construction of track so as to provide for economy of space, cheapness of construction and lessening of cost of maintenance by superimposing one track above the other.

Another novel feature in the construction of the railroad track is the steel shields below the rails which are designed to catch the car if any accident should occur to the axle at either end or to the wheel or rail while running at a high rate of speed so that the car, if it should drop from the axle or attempt to leave the track on either side would slide along in the groove thus formed by the shields until the power was shut off, or the momentum spent, thus preventing any serious damage to the car or its contents.

Another novel feature is that the shields take the place of cross-ties being fastened together at intervals.

Another novel feature likewise is in the width of the track which may be much wider than the standard gage.

As will be seen by the statement of novel construction made above the object of this invention is to provide a railroad and railroad car where a very high rate of speed can be obtained with a minimum of friction and atmospheric resistance and doing away with the necessity of employing a locomotive as well as to eliminate the suction of the air underneath and in the rear of the car noticeable in rapid moving trains of present construction. And another novel feature is the motive power table and its construction which allows the table to move in any direction necessary and at all times keep in perfect line and working position with the shaft. Still I do not intend that this shall be the only means employed for this purpose and do not expect to be confined to this particular mechanism, and show it only as one means to accomplish the results desired.

With such and other objects in view, my invention is embodied in the novel parts, arrangement and combination of parts hereinafter described and particularly set forth in the claims.

In the accompanying drawings I have illustrated an embodiment of my invention, but I desire it understood that I do not limit this invention in its useful application to the construction which is there shown, simply to give a better understanding of the invention.

In said drawings, Figure 1 is a side elevation of the coach in position on track. Fig. 2 is a vertical sectional view of the motor-table and base showing the ball-bearings, springs, guides and other mechanical construction to keep the power and driving shaft in easy working position. Fig. 3 is a vertical sectional view of the coach, along a line from X to Z in Fig. 1, showing a sectional view of the driving shaft, driving wheels, support of coach on axle, journal-boxes and hangers supporting the motor-table from the driving shaft, sprocket wheels, center and side bearings, motor and motor-table as held in position by the hangers journaled on the main shaft. Fig. 4 is a longitudinal sectional view of the axle or driving shaft showing the sphere or ball-like center. Fig. 5 is a sectional view of the center bearings and support, also the springs and other mechanism employed to allow the same to move to equalize the movement of the car. Fig. 6 is a side view of the driving wheel showing one set of pawls arranged in the hub thereof, with springs to hold them in position to engage in the ratchet-teeth on the axle. Fig. 7 is a transverse sectional view of the driving shaft showing the flutes or ratchet-teeth thereon to engage the pawls from the wheel hub. Fig. 8 is a transverse sectional end view of a double elevated track showing one track superimposed above the other, also showing the position of the shield forming a trough in which the car must fall in case of derailment or other accident.

Referring to said drawings wherein like reference characters refer to similar parts throughout the several views: In Fig. 1, 32 designates a car wheel having a hub in the inner circumference of which is placed a series of pawls 35 as shown in Fig. 6, to engage in the flutes or ratchet-teeth 40 upon the shaft 2 as shown in Fig. 7. The windows 4 and doors 5 in the coach 19 are made to conform to the shape of the car, and are constructed on either side of the coach flush with the surface, so that no resistance is offered in its passage through the atmosphere, and the car 19 is also provided with means for heating, lighting and ventilating when desired, is also provided with glass lookouts 28 at either end on the upper side, made to conform to the shape of the car 19, and permitting the motorman to have an unobstructed view of the track, and on the underside of these points are similar glass covered apertures 39 through which signal and head-lights can operate.

Underneath the floor in the car 19 is a space which may be utilized for disposing electrical storage batteries, tools, baggage or other purposes. Drawbars are arranged at each end of the car 19 and the ends of the car 19 are so constructed that they may be removed, exposing the drawbars, so that one car can be coupled to another when desired. Each end of the car is partitioned off for a motor or power room, and arrangements may be made for the handling and disposing of baggage, mail, express or other matter. Cars may be fitted up as passenger, sleeping, chair, parlor, dining, freight or other cars.

By referring to Fig. 2 it will be seen that the motor-table 11 is supported by hangers 7 which are journaled on the driving shaft 2. In order to relieve the great strain and friction which these hangers 7 would cause upon the shaft 2, I have arranged a base or turn-table 12 fitted with ball bearings 13 upon a sub-base 14 which also has ball bearings 15 upon its upper surface for the turn-table 12 to work upon, and springs 16 beneath the sub-base 14 to hold it in position, and of sufficient strength and so arranged as to relieve the shaft 2 of any weight arising from the motive power 6. In Fig. 2, 6 represents gasolene cylinder engines, supported upon the power table 11 through which a shaft 9 runs that is driven by this engine 6. Upon the shaft 9 is placed sprocket wheels 8 from which a sprocket chain 44 is run to sprocket wheels 27 upon main shaft 2, as shown in Fig. 3.

By referring to Fig. 3 a better understanding of the position of the motive power 6 to main shaft 2 can be had, and in Fig. 3 will be seen how the shaft 2 supports the car 19, and also how the shaft 2 passes through the apertures 41 in the side of the car 19, and how the apertures 41 are kept closed by the shields 28 which are arranged on the shaft 2, so they effectively close up the aperture 41 and prevent any inrush of air while the car is in motion. In order to furnish a support for the car 19 upon the shaft 2 which will permit the car body to adjust itself to a comfortable and safe position for passengers while rounding curves at a high rate of speed, and to offset the sudden jar or jolt caused from irregular or imperfect track, and at the same time to hold the car 19 firm, I have provided upon the roof on the inside of this car 19 a frame work 31 to which is attached a chafing plate 21, which rests upon another chafing plate 22 attached to a series of springs 24 by means of a clamp or bracket 23. The ends of these springs 24 rest upon the journal box holder 25 which is fitted with journals 26, in which the shaft 2 revolves, thereby furnishing a complete support for the car 19. The journal box holder is held in position by upright guide posts 42, which extend from floor of the car 19 and are made rigid, thus holding the journal boxholder 25 so it cannot move forward or backward. However, means are provided within the journal boxholder 25 which allow the journal-box 26 to adjust itself to the requirements of the shaft 2 in rounding curves.

The idea in this system is to provide means whereby the weight of the car is placed near the wheels 32 or end of the shaft 2, and at the same time have a center pivoted bearing 34 which will permit the shaft 2 to move in any direction while turning forward or backward, and yet to be firm and rigid with means as shown in Fig. 5, to allow the car 19 to move upward or downward as would be the tendency in running over obstacles on the track.

As above stated I have provided for the support of the car body 19 upon the shaft 2, and means are provided to place the weight upon the shaft 2 through journal bearing 26 near the end. Now in order to have a center pivoted bearing 30, as spoken of above, I have provided a ball-like center 34 to the shaft 2 and a framework support 31, that will not allow the journal-box 30 to move forward or backward, and so equipped with springs 37' and guides 43 working between the journal-box 30 and cross support 36 made rigid to the upright supports 31, thus providing a sphere shaped journal bearing 30 with spring 37 which holds the shaft 2 rigid horizontally, and yet allows the free play of the shaft 2 in compensation with the motion of the car, and provide the necessary adjustment while traveling over uneven surface or turning curves. Now this mechanism as above described is not the only means that I have in mind to accomplish all these requirements, and I do not intend that I should be held strictly to that method, but show and describe this means as a help to illustrate the principle involved.

The shaft may be an armature of an electric motor or may carry devices for steam, gasolene or other power. The front end of the car 19 can be made adjustable in its relation to the shaft 2 in frame 31, and permit the end to be raised or lowered as occasion requires or the demands of rapid transit and high rates of speed make necessary.

The wheels 32 being free on the shaft 2 can revolve faster than the shaft and take off the usual strain experienced on turning curves by the outside wheels, which are rigid to shaft on cars and engines.

While I only show one set of pawls 35 in the inner circumference of the wheel 32 I propose to have two sets, one set to be in reverse position of the other with means to throw either in or out of gear at will.

The pawls 35 engage in the flutes or ratchet points 40' compel the wheel 32 to turn as fast as the shaft 2, and will permit the wheel 32 to turn faster than the shaft 2 in either direction at the will of the operator. Where it is thought advisable not to have a double set of pawls and ratchets on the shaft, the wheel and shaft in the rear end of the car could be fitted up with ratchets and pawls in reverse position to those on the front. The operator could by any suitable means cause the power to be applied to the rear shaft, which being fitted with pawls and ratchets in reverse position to the front, thereby causing the car to move in a reverse direction, or if the car was moving forward these same means can be used to stop it, thereby dispensing with all other forms of brakes.

In a system of railways such as this, where the prime objects are safety, speed, cheapness of operation and maintenance, an elevated structure 39 preferably of steel is desired which is composed of cross-beams 45 longitudinal stringers 38 and necessary braces 40 and 41, all of which I do not claim as new, but the peculiar novelty of this construction lies in the semi-circular shields 37 which are joined together at intervals, and are designed to take the place of cross-ties, and also to catch and hold the car in case of any failure of shaft or wheel or other cause, and the novel feature of one track being superimposed above the other.

In reference to the power, it is obvious that when power is applied to the shaft 9 from the gasolene engine 6, that the sprocket wheel 8 will cause the sprocket wheels 27 on shaft 2 to revolve and the wheels 32 being on said shaft are likewise caused to turn by the pawls 35 engaging in the ratchet-teeth 40.

If at any time one wheel is required to turn faster than the other on account of being on the outer curve of the track, it will be allowed to do so by means of the inner circumference of the wheel hub, the springs 36' will be depressed and allow the pawls 35 to pass over the ratchet-teeth on shaft.

Further explanation of the operation and construction of this system of railways would seem unnecessary in view of the obviousness of its operation. Many other variations of the novel construction of the car, the application of the power and construction of the track will readily suggest themselves, but they are all subsidiary to and flowing out of the main features of the novel construction of a car of cylindrical shape, pointed at both ends mounted on wheels of large diameter, and being supported by a single shaft near each end, with journal-boxes, center and side bearings, and motive power table, so constructed as to bring the motions of the car, shaft and motive power table into unison, with means of applying power direct to the shaft of such wheels, with wheels and shaft so constructed as to engage with each other, and the diminishing of the resistance of the atmosphere pressure by means of the shape of the car, as well as the elimination of all unnecessary forms of construction outside and beneath the car, with a form of construction of car and track that does away with the suction of the atmosphere under and in the rear of the car when moving at a rapid rate of speed, and said car being adapted to railroads of the novel construction herein described and shown. Therefore it is believed that from the above description and drawings, the operation of my invention will be readily understood.

Having thus described my invention, what I claim as new and desire to secure by Letters Patent, is:

1. In a railway system, a cylindrical shaped automobile car pointed at both ends and carrying its motive power within said car, in combination with means to throw the weight of the car below the plane of its axle.

2. In a railway system, a cylindrical shaped automobile car, pointed at both ends and carrying its own power within the car, large wheels with means in the inner circumference of the hub to allow the wheel to turn faster than its axle.

3. In a railway system, an automobile car cylindrical in shape and pointed at both ends, carrying its own motive power within said car in combination with an axle passing through apertures in the car body near each end, having wheels of large diameter with means to allow the wheels to turn faster than said axle, said axle having means to receive motive power with means to adjust said car body in relation to the axle, to equalize the motion of the car on grades or curves.

4. In a railway system, an automobile car of cylindrical shape pointed at each end and carrying its own motive power within said car, having one axle passing through said car body near each end, upon which the car body is supported, with large wheels having means within the inner circumference of hub to allow the wheels to turn faster than the axle, in combination with hangers journaled upon said axle to which a table for motive power is attached.

5. In a railway system, a cylindrical shaped automobile car pointed at each end and carrying its own motive power within said car, with single axle upon which the car body is supported, passing through apertures in the car body near each end, having means to receive motive power with shields attached to shaft in position to prevent the inrush of air through the aperture in the car side through which the axle passes.

6. In a railway system, an automobile car of cylindrical shape pointed at both ends, carrying its motive power within said car, having a single axle passing through the body of said car which acts as a support for said car, having wheels of large diameter with means in the inner circumference of the hub to allow the wheels to turn faster than the axle, with means on shaft to receive motive power with hangers journaled upon said axle, said axle being sphere or ball shaped in the center in combination with bearings, substantially as shown and described and for the purposes specified.

7. In a railway system, a cylindrical shaped automobile car pointed at both ends, and carrying its own motive power in said car, supported near each end by a single axle, which passes through apertures in car body, with means on the axle to stop the inrush of air from the outside.

8. In a railway system, an automobile car cylindrical in shape pointed at both ends, and carrying its own motive power within said car, in combination with wheels of large diameter, provided with pawls to engage with ratchet-teeth upon said axle.

9. In a railway system, an automobile car of cylindrical shape pointed at each end, and carrying its own power within said car, having a single axle passing through apertures in the car body near each end, with means to receive and support the weight of said car, and means to equalize and bring the movements of the axle and car in unison.

10. In a railway system, a cylindrical shaped automobile car pointed at both ends, and carrying its motive power within said car, the combination of car body, driving wheels of large diameter provided with pawls, and axle with ratchet-teeth, substantially as described.

11. In a railway system, a cylindrical shaped automobile car pointed at both ends, and carrying its motive power within said car, the combination of driving wheels provided with pawls thereon, the axle passing through the body of the car near each end, provided with ratchet-teeth as described and for the purpose specified.

12. In a railway system, a cylindrical shaped automobile car pointed at both ends, and carrying its motive power within said car, the combination of the wheels turning loosely in a forward direction upon the axle, said wheels provided with pawls, an axle having ratchet-teeth to engage with said pawls, and springs to hold the ends of said pawls to engage in the ratchet-teeth and to permit the ends of pawls to be depressed, substantially as described and for the purpose set forth.

13. In a railway system, a cylindrical shaped automobile car pointed at both ends, and carrying its motive power within said car, with wheels of large diameter used as driving wheels, turning on single axles near each end, provided with pawls to engage with ratchets on said axles, substantially as described.

14. In a railway system, a cylindrical shaped automobile car pointed at both ends, and carrying its motive power within said car, in combination with wheels of large diameter turning loosely on axle in a forward direction, and said car being provided with openings near each end through which the axles pass and means of supporting the car on said axles.

15. In a railway system, an automobile car of cylindrical shape pointed at both ends, and carrying its own power within said car being supported upon a single shaft near each end, having a sphere or ball shaped center, and passing through apertures near each end, upon which the car is supported from the roof on inside of car, substantially as shown and described.

16. In a railway system, an automobile car of cylindrical shape and pointed at each end, having a single axle with sphere or ball shaped center passing through the apertures in the side of car near each end.

17. In a railway system, an automobile car of cylindrical shape and pointed at both ends, in combination with an axle with a sphere or ball shaped center as shown and described and for the purpose specified.

18. In a railway system, an automobile car of cylindrical shape and pointed at both ends, with single axle which passes through apertures in the side of the car near each end, means of supporting said car upon said axle, which will allow the axle to move out of the plane of its usual revolution, for the purpose specified.

19. In a railway system, an automobile car of cylindrical shape and pointed at both ends, carrying its own power within said car, having one axle with sphere or ball shape center passing through aperture in car body near each end.

20. In a railway system, an automobile car of cylindrical shape pointed at both ends, with an axle passing through apertures in the side of the car body near each end, with center and side bearings inside of the car, constructed to support the weight of the car on the axle, equalize the motion of the car and axle, and hold said car and axle in their relative positions.

21. In a railway system, an automobile car of cylindrical shape and pointed at both ends, having an axle passing through apertures in the sides of the car near each end, side and center bearings inside of the car, constructed to support the weight of the car on the axle, equalize the motion of the car and axle, and hold said car and axle in their relative positions, in combination with hangers journaled upon said axle, as substantially shown and described for the purpose specified.

22. In a railway system, a cylindrical shaped automobile car pointed at both ends, and carrying its motive power within said car, supported on a single axle near each end, journal-boxes and center-bearings inside of said car which support the weight of the car on said axle, permit and equalize the motions of the axle and car, and hold them in their relative positions, and a movable motor-table in said car which moves in unison with the play of the axle, all for the purpose specified.

23. In a railway system, a cylindrical shaped automobile car pointed at both ends, and carrying its motive power within said car, supported by a single axle near each end, provided with center-bearings inside the car, and movable motor-table which moves in unison with the play of the axle, and is journaled and supported on said axles for the purpose herein specified.

24. In a railway system, a cylindrical shaped automobile car pointed at both ends, and carrying its motive power within said car, in combination with a movable motor-table which moves in unison with the play of the axle, and is journaled and supported on said axle for the purpose herein specified.

25. In a railway system, a cylindrical shaped automobile car pointed at both ends, and carrying its motive power within said car, in combination with a car supported by a single axle near each end, with center-bearings inside the car, and movable motor-table which moves in unison with the play of the axle, and is journaled and supported thereon, substantially as shown and described.

26. In a railway system, a cylindrical shaped automobile car pointed at both ends, and carrying its motive power within said car, in combination with a car supported by a single axle near each end and constructed with wheels of large diameter on said axles, center-bearings and journal-boxes in said car on said axles, for the purpose specified, the movable motor-table journaled and supported on said axles, and also supported on a stationary surface, with means of reducing the friction of such movement on the shaft, said motor-tables carrying means of applying power to said shaft and transmitting the same to the axles of the wheels.

27. In a railway system, an automobile car of cylindrical shape, carrying its own motive power inside of said car, in combination with a shaft with a sphere or ball center, with means for the support of said car from the inside of the roof near each end, and means to relieve the axle of sudden motions of the car.

28. In a car of cylindrical shape pointed at both ends, and carrying motive power within said car, having a single axle near each end with sphere or ball shaped center means to permit the weight of the car to rest on the axle near each end inside of the car, means for the adjustment of a motor-table to keep it in a working position with the axle at all times, in combination with wheels of large diameter having means on the inner circumference of the hub to engage with said axle, substantially as shown and described.

29. In a car of cylindrical shape, pointed at both ends, carrying motive power inside of the car, with a single shaft having a sphere or ball like center passing through apertures in the car body near each end, means provided on said axle near each end inside of car to receive the weight of the car, means on the axle to close the apertures in the sides of the car body through which the axle passes, means to support hangers which attach at the other end to a motor-table, in combination with large wheels having means on the inner circumference of the hub to engage with said axle, with means to allow the wheel to turn faster than the axle when necessary, all substantially as described and for the purpose specified.

30. In a car of cylindrical shape pointed at both ends, and so constructed that a portion of the points can be removed, means in each end to couple one car to another in combination with an axle, with a sphere or ball shaped center.

31. In a car of cylindrical shape, and pointed at both ends, carrying motive power inside of said car, each end so constructed that a portion of the points can be removed, means in each end to couple one car to another, in combination with an axle having a sphere or ball shaped center.

32. In a car of cylindrical shape, pointed at both ends, carrying motive power inside of said car, with end of car so constructed that a portion of the points can be removed, means in each end to couple one car to another, in combination with an axle having a sphere or ball shaped center, and center-bearings to allow said shaft to move out of the ordinary plane of revolution.

33. In a car, the combination of an axle passing through apertures near each end, wheels of large diameter adjusted on said axle to move freely in a forward direction, journal-boxes in which said axles turn, and center-bearings, all within said car.

34. A car constructed with wheels of large diameter, axles passing through said car near each end, journal-boxes in which said axles turn, center-bearings connected with said journal-boxes, means of applying power to said axle, motor-table constructed with journal-boxes resting on said axle and supported by a rigid support at the other end, provided with means for reducing the friction, and glass lookouts substantially as shown and for the purpose specified.

35. In a car the combination of wheels of large diameter fitted with pawls to engage with ratchets on axles, axles passing through said car near each end, and provided with ratchets to engage with pawls, journal-boxes inside said car through which said axles pass and in which they revolve, center-bearings connected with the journal-boxes so as to allow the axles to turn in or move out of the plane of ordinary revolution, motor-table journaled on said axle at one end, and supported at the other end on a stationary surface, means for lessening the friction of the movement of the rigid supporting hanger, means for allowing the rigid support to move up and down while held in place, and means for applying power to the axle of said wheels, substantially as described and for the purpose specified.

36. In a car the combination of wheels of large diameter, provided with pawls in the hub, axles passing through the car near each end and provided with ratchets, journal-boxes and center-bearings allowing play of the axle and supporting car on said axle, the movable motor-table journaled and supported on the axle, and supported at the other end by rigid supporting hangers, the rigid supporting hanger resting and moving on a stationary surface, means for diminishing the friction of said movement, means to allow the power shaft to move slightly up and down, and the power shaft provided with means for transmitting power to the axle, substantially as shown and for the purpose specified.

37. In a car the combination of wheels of large diameter provided with pawls in the hub, axles passing through the car near each end and provided with ratchets, journal-boxes and center-bearings allowing play of the axle and supporting car on said axle, the movable motor-table journaled and supported on said axle and supported at the other end by supporting hanger, the supporting hanger resting and moving on a stationary surface, means for diminishing the friction of said movement, means to allow the power shaft to move slightly up and down, and the power shaft provided with means for transmitting power to the axle, substantially as shown and for the purposes specified.

38. In a car or other vehicle of cylindrical shape, pointed at both ends, having an axle near each end carrying wheels of large diameter, with means on inner circumference of the hub to engage with said axle, in combination with an elevated railroad system, substantially as shown.

39. In a railway system, a car constructed with its weight near the plane of its axle and means for changing and adjusting said weight in relation to the plane of said axle.

40. In a railway system, a car applying power direct to axle within said car, so constructed as to have its weight near the plane of the axles, with means of shifting and adjusting the weight with relation to the axle.

41. An automobile car, carrying its own power and applying same direct to the axle within said car, axles passing through the car near each end, with wheels of large diameter turning loosely on said axles, and provided with means for engaging with said axle when required, and with its center of gravity adjustable in relation to the plane of the axle.

42. In a car or other vehicle of cylindrical shape, pointed at both ends, carrying its own power in said car, an axle having a sphere or ball shaped center-bearing, having journal-bearings, constructed to accommodate said sphere shaped center-bearing, and allow it to move in any direction to equalize the movement of the car-body, substantially as shown and described.

43. An automobile car of cylindrical shape, pointed at both ends, carrying its own power within the car, an axle with a sphere shaped center-bearing which passes through apertures in the car body near each end, means to distribute the weight of said car on said axle, means to close apertures in sides of car body, except the space needed for said axle to pass through, so constructed that the shaft can when necessary move out of its ordinary plane of revolution, without leaving an opening for the air to rush in, motor-table inside of said car with means to attach it to said axle, means on the motor-table to generate power to propel said car, and means to transmit said power within said car.

44. In a railway system, an automobile car of cylindrical shape, pointed at both ends, a motor-table with means to hold it in a working position with the driving axle, means on said motor-table to generate power to propel said car and means to transmit said power to said axle.

45. In a railway system, an automobile car of cylindrical shape and pointed at both ends, a motor-table carrying motive power, driving axle and means to hold the motor-table in a working position with the axle, means to relieve the strain of the motor-table upon said axle, with means to transmit motive power from the motor-table to its driving axles.

46. In a railway system, a double elevated track, one track superimposed above the other with a semi-circular shield joined together at intervals.

47. In a railway system, a double track with one track superimposed above the other having semi-circular shields joined together at intervals, and forming means to receive the car in case car should leave the track while in motion.

48. In a railway system, semi-circular shields joined together at intervals to take the place of cross-ties.

49. In a railway system, an automobile car of cylindrical shape and pointed at both ends, having but one axle near each end, means on the inside to generate motive power to propel the car, means to transmit this power to the driving axle, means to distribute the weight of car on axle from the roof on inside of car, means to support the body of the car between the two axles, means to reverse the application of power to the axle, means to heat, light and ventilate said car, all inclosed within the car body for the purpose herein specified.

50. In a railway system, an automobile car cylindrical in shape, carrying its own motive power within said car, with means to transmit said power direct to the driving axles inside of car, in combination with a double railroad track, one track superimposed above the other, each having semicircular shields therein to catch the body of the car in case of accidents, said shields being joined together at intervals to take the place of cross-ties.

51. In a railway system, an automobile car cylindrical in shape, pointed at both ends, carrying means on inside of car to generate motive power, means to support said motive power, means to transmit said motive power inside of the car to driving axles, means to bring the motions of the motive power and axles in unison, in combination with a double railway track, one track superimposed above the other, each track having semi-circular shields arranged to catch and hold the car body with said shields joined together at intervals.

52. In a railway system a cylindrical shaped automobile car, pointed at both ends, having means to generate motive power for its own propulsion and apply it direct to driving axles inside of said car in combination with a motor table having means to hold it in a working position with said driving shafts.

53. In a railway system a cylindrical shaped automobile car, pointed at both ends, having means to generate motive power for its own propulsion and means to apply it direct to driving axles inside of said car in combination with a car body as herein shown supported upon a driving shaft near each end of car, said shaft having ball or sphere shaped center.

54. In a railway system a car as herein described with means to generate motive power for its own propulsion and application direct to driving axles inside of said car with means for ventilating, heating, lighting and cooling in combination with driving shafts with sphere or ball shaped centers.

55. In a railway system an automobile car as herein shown and described with means to generate and apply motive power to driving axles having sphere or ball shaped centers inside of said car.

56. In a railway system a car as herein shown and described with driving axles having sphere shaped centers in combination with suitable center bearings and means to bring the movements of the car body and axles in harmony with each other.

57. In a railway system a car as herein shown and described, having means to generate motive power and apply it direct to driving axles inside of said car, means to regulate the speed of said car, means for receiving and giving signals to stations or other cars, and means for actuating the doors and windows from a given point.

58. In a railway system a cylindrical shaped automobile car pointed at both ends with means in the inside of said car to generate motive power and apply it to driving axles which pass through the car body near each end, in combination with wheels, center bearings, and motor table as herein shown and described and for the purpose specified.

59. In a railway system a cylindrical shaped automobile car pointed at both ends having means to generate and apply motive power to driving axles inside of said car, in combination with driving axles with sphere or ball shaped center, center bearings as herein shown and described, movable motor table with means to keep it in line with the driving shaft, and means to equalize all the movements of the car when in motion.

60. In a railway system a cylindrical shaped automobile car as herein shown and described, having axles with sphere shaped centers passing through the car body near either end, upon which the car body is supported from a central point of the roof on inside of said car, with means to distribute the weight of car at different points along the shaft, so that there will be at least two points where the weight of the car body will rest upon the shaft at all times.

61. In a railway system a cylindrical shaped automobile car pointed at both ends, and otherwise as herein shown and described, in combination with safety shields between the rails, joined together at intervals, and arranged to catch the car body.

62. In a railway system a cylindrical shaped automobile car pointed at both ends, with means to generate and apply motive power to driving axles inside of the car, means to allow the driving shafts to adjust themselves to the requirements of the car body in rounding curves at different rates of speed, and means whereby an unobstructed view of the track ahead of the car can be had at all times.

63. In a railway system a cylindrical shaped automobile car pointed at both ends and otherwise as herein shown and claimed in combination with a double track, one track superimposed above the other, with safety shields in each track to catch and retain the car body.

64. In a railway system a cylindrical shaped automobile car pointed at both ends, carrying means to generate and apply motive power to driving axles with sphere shaped centers, inside of said car, in combination with a motor table for the purpose specified, with means to keep it in a working position with the driving axles at all times.

65. In a railway system, a car supported at either end upon a single axle, with means to allow the axles to automatically adjust themselves to the requirements of the car body and track in rounding curves, in combination with journal boxes having sphere shaped centers, through which the axle passes.

66. In a railway system an automobile car supported at each end by a single axle which passes through the car body with means to adjust the axles in a working position to the track and car body in rounding curves.

67. In a railway system an automobile car supported upon a single shaft near each end, with means to adjust the front shaft to the requirement of the track and car body in rounding curves; means to lock the rear shaft and hold it rigid.

68. In a railway system, a car supported at either end, upon a single shaft, having sphere shaped center, with means to throw the axle out of its position in running on a straight track, and assist the wheels and axle to adjust themselves, to the needed position, in rounding curves.

69. In a railway system, a car supported at either end, upon a single shaft having sphere shaped center, journal bearings with sphere shaped centers, motor table as herein described, and means to regulate the position of axle and wheels in relation to the car body, in combination with a pilot to remove obstructions from the track in front of a car while in motion.

70. In a railway system, a car supported at either end upon a single axle, with steering apparatus to throw the wheels out of line with the car body, in combination with journal bearings with sphere shaped centers, with means to hold the bearings in a parallel position, with the car body, at all times, and means to allow the bearings to move forward and backward to the requirements of the journals in rounding curves.

71. In a railway system, a car supported at either end upon a single axle having sphere shaped center, movable journal bearings with sphere shaped centers, in combination with a suitable yoke to allow the journal boxes to move forward and backward automatically.

JAMES B. FOWLER.

Witnesses:
J. E. BLACKBURN,
O. R. KOHN.